July 31, 1962

N. E. MARCUM ETAL 3,047,869

ROTATABLE MAGNETIC DISC MOVABLE TOWARD AND FROM DISC CARRYING TRANSDUCER

Filed May 25, 1959

4 Sheets-Sheet 1

INVENTORS
NORMAN E. MARCUM
WILLIAM A. FARRAND

BY

John A. Duffy

AGENT

*INVENTORS*
NORMAN E. MARCUM
WILLIAM A. FARRAND
BY
John A. Duffy
AGENT

INVENTORS
NORMAN E. MARCUM
WILLIAM A. FARRAND
BY
John A. Duffy
AGENT

INVENTORS
NORMAN E. MARCUM
WILLIAM A. FARRAND
BY
John A. Duffy
AGENT 3,047,869

ROTATABLE MAGNETIC DISC MOVABLE TOWARD AND FROM DISC CARRYING TRANSDUCER

Norman E. Marcum, La Habra, and William A. Farrand, Downey, Calif., assignors to North American Aviation, Inc.

Filed May 25, 1959, Ser. No. 815,556
4 Claims. (Cl. 346—74)

This invention relates to a magnetic recorder and more particularly to a magnetic disc recorder for storing and reproducing electrical signals.

In the data processing and computer field there is an urgent need for a memory device to record and reproduce electrical signals representing computer information which is versatile and capable of handling many bits of information without being mechanically cumbersome or electrically inefficient. Similarly, there is a need for a light-weight magnetic memory device for use in digital computers provided in aircraft and guided missiles.

Magnetic storage devices of prior art have failed to meet the increasingly difficult requirements of today's computers. Among the more specific problems and disadvantages of prior art magnetic storage devices is the problem of providing recorders capable of storing a great deal of information without being mechanically cumbersome and complicated. In order to record a great deal of information on a small recording surface extremely small mechanical tolerances are required. Devices of the prior art failed to obtain a suitable space relationship between the magnetic storage disc and the recording device to meet the requirements. Misalignment between the storage disc and the reading and writing structure results in amplitude and frequency modulation of the electrical signals received from the recorder producing unreliable and false information from the magnetic storage device. Additionally, magnetic recorders of the prior art were necessarily large in order to handle the amount of information required.

The device of this invention provides a versatile and efficient magnetic disc recorder of simple mechanical structure and capable of handling a great deal of electrical information. Simplified design and easy construction provide a device which insures the required mechanical alignment between the recording disc and the reading and writing structure. A precision space relationship between the heads and the magnetic storage disc is obtained by having relatively few movable parts therein. Close mechanical alignment is provided between the disc recorder and the magnetic heads by structure which resists uneven bearing deflection caused by acceleration forces thereon. Simpler and lighter weight construction is utilized to obtain a compact magnetic recorder.

It is therefore an object of this invention to provide an improved magnetic disc recorder.

It is another object of this invention to provide a disc recorder providing minimum of radial deflection between the magnetic storage disc and the magnetic heads.

It is a further object of this invention to provide a magnetic disc recorder of close mechanical and electrical alignment between the magnetic storage disc and the magnetic head.

It is a still further object of this invention to provide a disc recorder relatively insensitive to acceleration loads thereon.

It is another object of this invention to provide a disc recorder that is economical in construction and requires a minimum of precision construction.

It is a further object of this invention to provide a magnetic disc recorder with flexible means insensitive to acceleration loads for maintaining close mechanical and electrical alignment between the magnetic storage disc and the magnetic head.

Other objects of invention will become apparent from the following description taken in connection with the accompanying drawings in which FIG. 1 is a cross-section of the preferred embodiment of this device;

Figure 6:
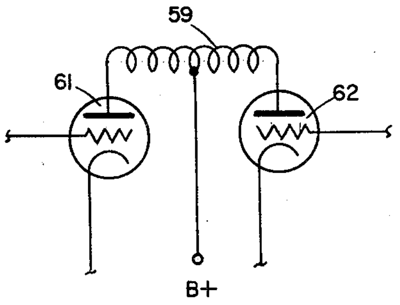
Figure 7:
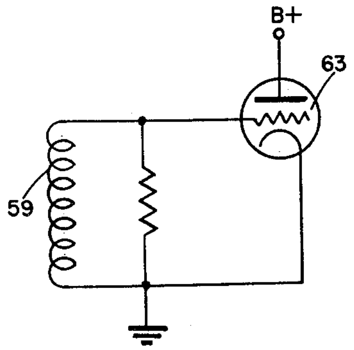

FIGS. 6 and 7 indicate typical head connections to an amplifier; and

Figure 8:
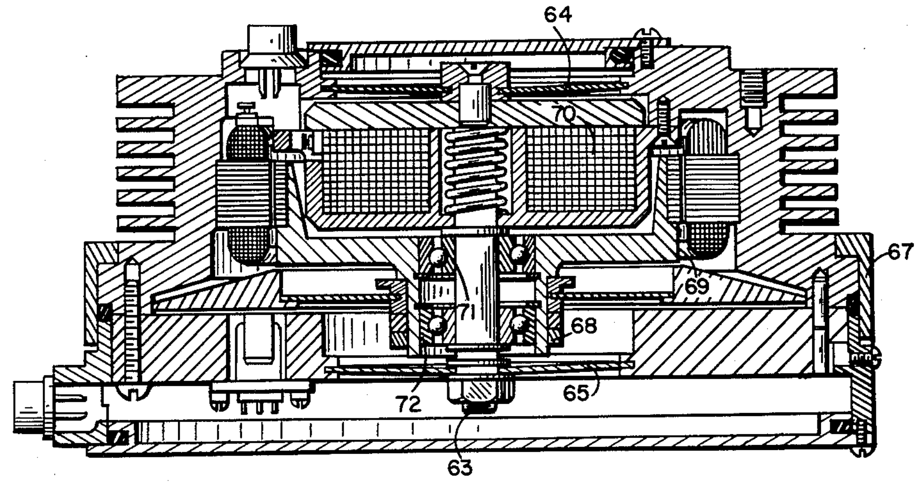

FIG. 8 is a cross-sectional view of an alternative embodiment of the recorder of this invention.

This device is an improvement of a co-pending application entitled Magnetic Disc Recorder, Serial No. 413,315, by William A. Farrand et al., now Patent No. 2,899,260. The application by William A. Farrand et al. for a Magnetic Disc Recorder relates to an improved magnetic disc recorder having a magnetic storage disc in uniformly spaced relationship with the magnetic head being spaced by a boundary lubricated viscous shear air bearing which permits a minimum of deflection and acts to maintain evenly spaced relationship between the heads and the disc.

Figure 1:
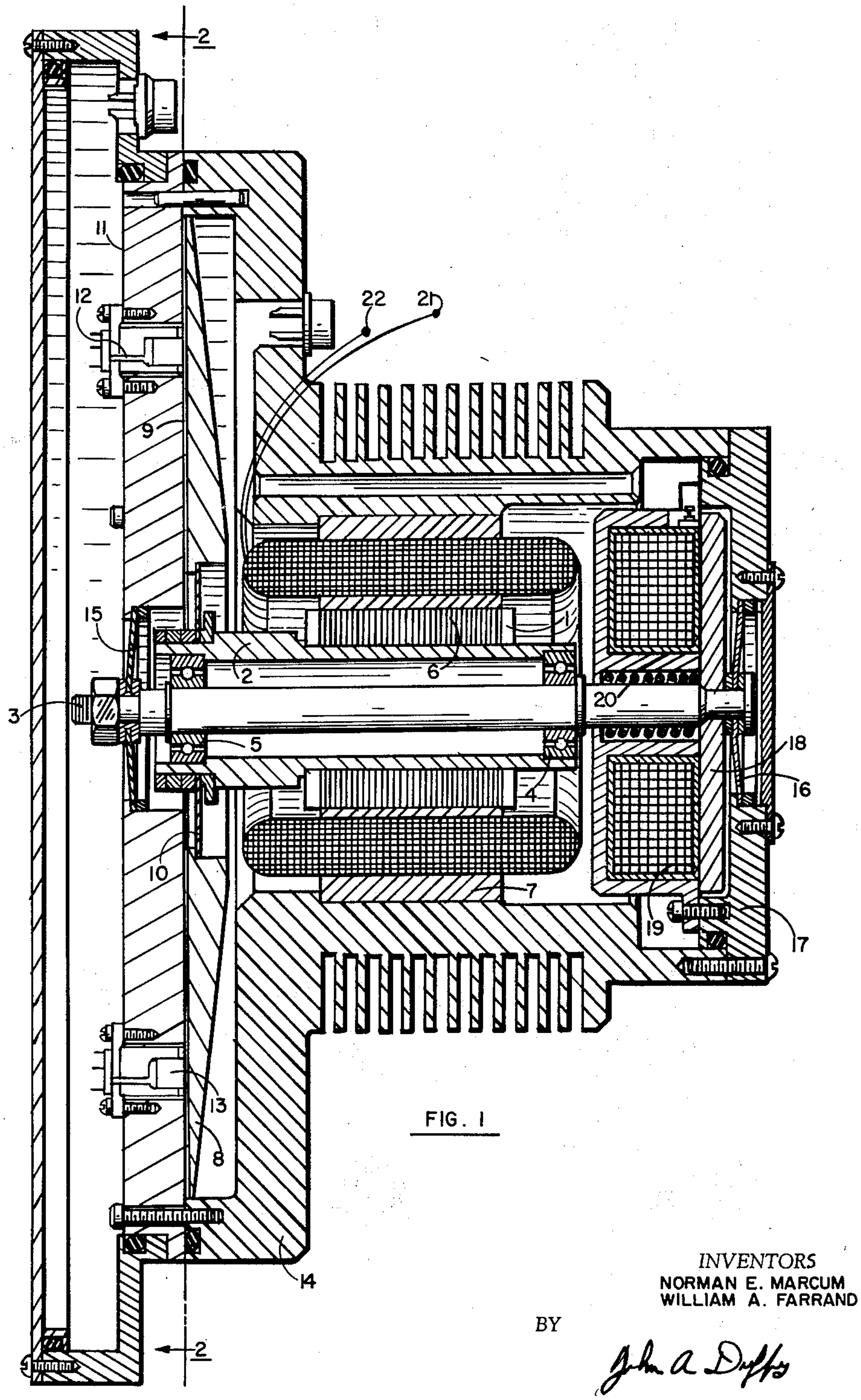

Referring now to FIG. 1 of the preferred embodiment of the device, there is shown in cross-section the disc recorder of this invention. Rotor 1 has a portion 2 thereof rotatably mounted on shaft 3 by bearings 4 and 5 located at opposite ends of portion 2. Rotor winding 6 is disposed opposite stator 7 which forms a motor to rotate rotor 1 about shaft 3. At one end of shaft 3 is ferromagnetic disc 8 which has a retentive magnetic material 9 cast in an annular ring on its upper surface. Disc 8 is suitably necked down to form a flexible web 10 between the hub and the outer annular portion of the disc. Web 10 is rigidly attached to portion 2 of rotor 1 and rotates therewith. Headplate 11 having a number of recording heads, for example 12 and 13, located thereon has its recording face located in close proximity to the magnetic face 9 of disc 8. Record or read heads 12 and 13 are located on the lower face at various positions in headplate 11. In order to operate with the desired mechanical and electrical characteristics, it is necessary that the inner face of headplate 11 be in a closely spaced relationship with disc 8 with a gap between them being on the order of 0.0001 of an inch. A boundary lubricated viscous shear bearing between disc 8 and headplate 11 is developed to acquire a proximity of this order. Headplate 11 is rigidly attached at its outer diameter to main housing 14. Flexible diaphragm means 15 attaches the inner diameter of headplate 11 to the upper end of (near disc 8) shaft 3. Diaphragm 15 may consist of a thin fiber glass disc having its inner diameter suitably attached to shaft 3 and its outer diameter attached to the inner diameter of headplate 11. The lower end of shaft 3 is similarly mounted in flexible diaphragm means 16 which has the circle formed by its outer diameter rigidly attached to rear plate 17 of housing assembly 14. Shaft 3 is adapted for longitudinal movement in relation to housing 14 by means of flexible diaphragms 15 and 16. At the other end of shaft 3 is a ferromagnetic disc or plate 18 rigidly mounted on shaft 3. Disposed near disc 18 is solenoid 19 suitably attached to housing assembly 14. Spring 20, which may be of the coil type wound about shaft 3, maintains a predetermined downward thrust on shaft 3 relative to housing assembly 14.

In operation initially while the motor is being brought up to speed solenoid 19 is not energized and preloaded coil spring 20 maintains shaft 3 so that disc 8 is in a predetermined space relationship with headplate 11. As the motor reaches a speed suitable for developing a boundary lubricated air bearing, as more fully described in the co-pending application by William A. Farrand et al., solenoid 19 is energized by current received through terminal wires 21 and 22. Such solenoid may be energized by a hand-thrown switch or by automatic means well known in the art. Ferromagnetic plate 18 is attracted toward solenoid 19 causing shaft 3 and disc 8 to move toward headplate 11 within the limits allowed by the structure of solenoid 19. The amplitude of movement allowed is such that a boundary lubricated air bearing is developed between the face of disc 8 and the face of headplate 11 before solenoid closure. The force developed by solenoid 19 when closed counteracts the longitudinal thrust of the air bearing and the counter thrust developed by flexible diaphragm means 15 and 16 which are flexed by the movement of shaft 3. The solenoid force is sufficiently larger than those counter forces to prevent any misalignment due to acceleration and related forces. Additionally, the necked down web 10 of disc 8 becomes loaded as a spring and the disc 8 is held in close spaced relationship with headplate 11. Due to the quality of the air bearing, misalignment between shaft 3 and headplate 11 will cause web 10 to flex in each rotation and tend to maintain disc 8 parallel to headplate 11. Flexible diaphragm means 15 and 16 being loaded as a spring further tend to maintain a close spaced relationship between disc 8 and headplate 11 by its flexible arrangement during the operation thereof.

It may readily be seen from the structure of FIG. 1 that any misalignment between disc 8 and headplate 11, caused for example by acceleration forces when the recorder is mounted in an airplane, will be minimum due to the few parts. For example, disc 8 is mounted to rotate about shaft 3, rotating relative to headplate 11. Disc 8 is mounted on shaft 3 by bearings 4 and 5. Therefore, the slight misalignment caused will be due to the minute misalignment inherent in the bearings. This misalignment is corrected by the flexible diaphragm means 15 and 16 as well as web 10 of disc 8. Or, in other words, there is compliance of shaft 3 and disc 8 relative to housing 14 and headplate 11 in a longitudinal direction due to the longitudinal compliance of diaphragm means 15 and 16. On the other hand, there is no compliance between diaphragm means 15 and 16 and headplate 11 in a radial direction which prevents misalignment due to any radial forces such as acceleration, etc.

Figure 2:
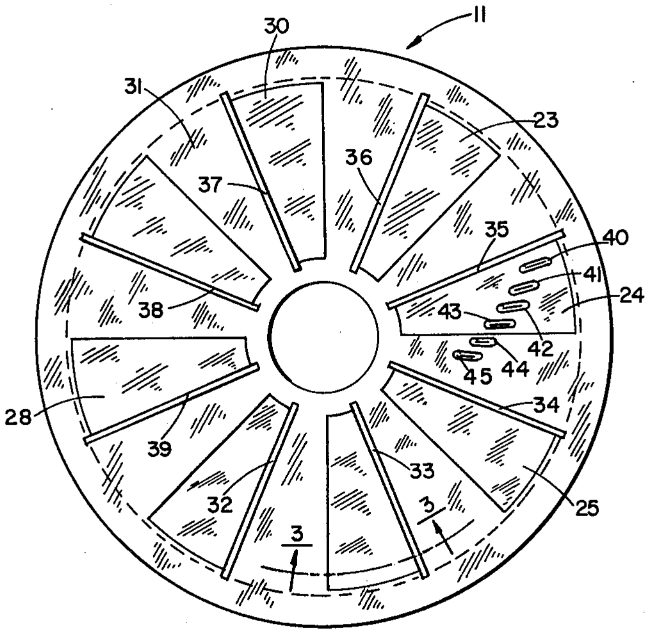
FIG. 2 is a view of one form of headplate from the underside, line 2—2 of FIG. 1.

Turning now to FIG. 2, there is shown a view of headplate 11 looking from the underside taken at line 2—2 of FIG. 1. In this view, as seen from the underside of the headplate, a plurality of troughs or steps 23, 24, 25, 26, 27, 28, 29, and 30 are cut into or otherwise formed below the surface 31 of the headplate 11 and over a major portion of the area thereof as illustrated. In conjunction with each of the steps 23–30 is an associated groove or trench, also shown in FIG. 2 and numbered 32, 33, 34, 35, 36, 37, 38, and 39. These grooves are somewhat deeper than the steps 23–30 and provide inlet paths and allowing air to be drawn into the negative pressure area of boundary lubricated air bearing. Communication is allowed with the external atmosphere by extending grooves 32–39 beyond the circumference of the juxtaposed recording disc 8. As illustrated in FIG. 2, wherein recording disc 8 is denoted by the dotted lines, each of the grooves 32–39 extends radially beyond the outer circumference of recording disc 8. Also as shown, recording disc 8 is of sufficient radial dimensions so as to overlap the steps 23–30.

Figure 3:
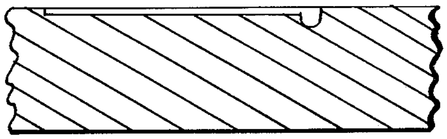
FIG. 3 is a partial cross-section of the headplate shown in FIG. 2 as cut by the surface 3—3.
Figure 3A:
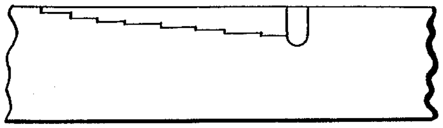
FIG. 3A is an illustration of the step arrangement of headplate 11.

The steps and grooves formed in the headplate 11 are further illustrated in the cross-section view of FIG. 3 taken along the surface 3—3 of FIG. 2. Step 26 is representative of each of the steps 23 through 30 and has a uniform depth as shown. Groove 33 is representative of each of the grooves 32 through 39 and is located along one side of the step 26 and extends deeper into the headplate than the step 26. In FIG. 3 the step and groove are of exaggerated dimensions for clarity. The depth of each step is typically .0004 inch while the depth and diameter of the circular groove 33 is typically .015 inch.

The headplate shown in FIGS. 2 and 3 forms an air bearing with the flat magnetic disc 8 in a manner similar to that previously described in co-pending application entitled Magnetic Disc Recorder by William A. Farrand et al. This headplate construction is quite satisfactory for high operational speeds in the order of 3500 to 12,000 revolutions per minute.

Recording and reading magnetic heads such as 40, 41, 42, 43, 44, and 45 may be located around the underside of headplate 11 flush with the surface thereof. It will be understood that the number and arrangement of heads is a matter of choice and is limited by the physical dimensions of the heads themselves.

While the illustrated discs and heads are planar, it will be readily appreciated that there may be utilized other configurations such as, for example, semi-spheres having spherical surfaces everywhere equidistant and mutually spaced as previously described.

Figure 4:
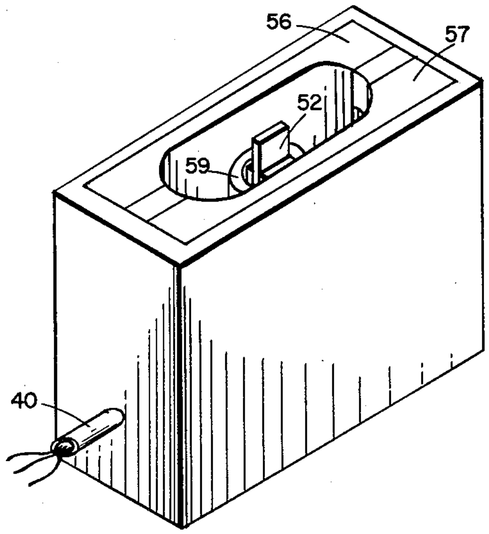
FIG. 4 is an enlarged perspective view of a magnetic write head used in the recorder of FIG. 1.
Figure 5:
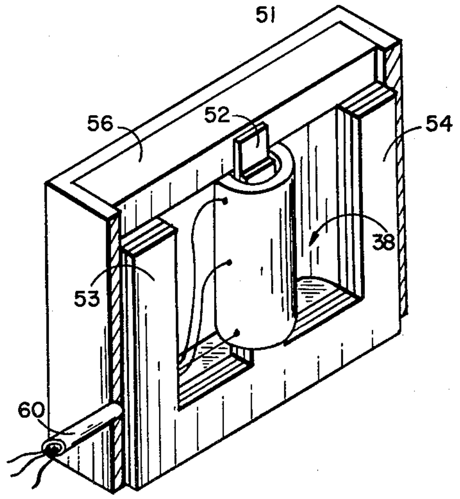
FIG. 5 is a partial cross-section of a read head which is similar to that in FIG. 4.

A magnetic write head which has been developed for use in this device is that indicated in FIG. 4. FIG. 5 shows a read head of similar construction. Both heads include a pole piece 52 as indicated in FIG. 5 constructed of three laminations, each 0.001 inch thick. The pole piece should be of high permeability material. This is commonly nickel and iron, or nickel, iron, and cobalt alloy, such as Supermalloy. The opposite limbs 53 and 54 of the pole piece are held between sections 56 and 57 of ferrite material having a hollow center portion 58 through which the center limb of pole piece 52 extends. A ferrite and ceramic material having high initial permeability and high bulk resistivity is satisfactory for the construction of sections 56 and 57. A coil of wire 59 is wound around the center limb of pole piece 52 and has a center tap and a tap at each end. A shield 60 is provided for the connections to coil 59. Into the hollow portion 58 in the ferrite sections 56 and 57 is deposited a plastic dielectric mixed with a filler, such as an epoxy resin mixed with glass beads. This material provides rigidity and matches its expansion to the expansion of the surrounding materials with applied heat. It is noted that the center lamination of the pole piece 52 extends above coil 59 while the remaining two laminations terminate approximately flush with the uppermost end of coil 59. Also, the limbs 53 and 54 terminate below the face of ferrite sections 56 and 57. In this manner, the return magnetic path is the whole face of sections 56 and 57. The heads of FIGS. 4 and 5 differ in the spacing at the face of the head between the ferrite sections and the pole piece 52. In FIG. 5, the read head, this spacing is about 0.002 of an inch.

FIG. 6 indicates how the three connections to the write head would be utilized in recording upon the magnetic disc, the center tap of coil 59 being connected to the B+ supply and each end of the winding being connected to the plate of respective driver tubes 61 and 62. A phantom center tap can be substituted in this instance for an actual center tap.

FIG. 7 indicates how the head in FIG. 5 is utilized as a reading head. The center tap is unused and one end of the coil is connected to ground. The other end is connected to the grid of a detector tube 63.

Turning now to FIG. 8 there is shown a cross-section of a recording disc of the alternative embodiment of this invention. The disc recorder in FIG. 8 is of extremely light-weight and compact construction designed specifically for computer operation in an aircraft or guided missile. In the device of FIG. 8 there is shown a shaft 63 having mounted thereon flexible diaphragm portions 64 and 65 at each end, with flexible diaphragm 65 attached to headplate 66 and flexible diaphragm 64 at the other end of shaft 63 attached to housing assembly 67 similar to that as shown in the disc recorder of FIG. 1. Rotor 68 has a Z-shaped portion 69 having one end containing the hysteresis rotor ring, and the other end mounted for rotation about shaft 63. Solenoid 70 then fits in the groove provided by the irregular Z-shaped rotor portion 69, thereby making the construction more compact. In this manner bearings 71 and 72 may be located in close proximity thereto to reduce the initial slope in the device thereby allowing a preload thrust adjustment to further reduce misalignment between the disc and the headplate. The operation of the disc recorder of FIG. 8 is similar to that as described in FIG. 1.

The magnetic disc recorder of this invention is particularly adapted for use in high speed digital computers needing a storage device capable of handling the information required by a complicated computer. The compact mechanical structure of the recorder lends itself well to packaging in a small computer. Additionally, the design of the recorder, as described, is fully reliable for use in airplanes being particularly adaptable to withstand larger acceleration forces.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a magnetic recorder, a housing, a first disc fixedly mounted to said housing, a second disc having a magnetizable medium on one face and adapted to assume a position in which the magnetizable face of said second disc is contiguous to a face of said first disc, and shaft means for rotating said second disc relative to said first disc to develop a self-lubricated viscous shear gas bearing between said discs, said second disc having a resilient portion between said magnetizable face and said shaft means, said shaft means comprising a shaft on which said second disc is journalled and resilient means for mounting said shaft to the first disc and to the housing with axial compliance and radial rigidity.

2. In a magnetic recorder, a housing, a first disc fixedly mounted to said housing, a shaft, resilient means for mounting said shaft to the first disc and to the housing with axial compliance and radial rigidity, a second disc having a magnetizable medium on one face and adapted to assume a position in which the magnetizable face of said second disc is contiguous to a face of said first disc, said second disc having a resilient hub portion rotatably mounted on said shaft, and means for rotating said second disc relative to said first disc to develop a self-lubricated viscous shear gas bearing between said discs.

3. In a magnetic recorder, a housing, a first disc fixedly mounted to said housing, a shaft, resilient means for mounting said shaft at either end thereof to the first disc and to the housing respectively with axial compliance and radial rigidity, a second disc having a magnetizable medium on one face and adapted to move from a remote position to a position in which the magnetizable face of said second disc is contiguous to a face of said first disc, said second disc having a resilient hub portion rotatably mounted on said shaft, means for rotating said second disc relative to said first disc to develop a self-lubricated viscous shear gas bearing between said discs, and means for thrusting said second disc and said shaft toward said first disc while said second disc is being rotated.

4. In a magnetic recorder, a housing, a first disc fixedly mounted to said housing, a second disc having a magnetizable medium on one face and adapted to move from a remote position to a position in which the magnetizable face is contiguous to a face of a said first disc, shaft means for rotating said second disc relative to said first disc to develop a self-lubricated viscous shear gas bearing between said discs, said shaft means comprising a shaft and resilient means for mounting said shaft at opposite end portions thereof to the first disc and to the housing respectively with axial compliance and radial rigidity, said second disc having a resilient portion between said magnetizable face and said shaft means, and means for thrusting said second disc and said shaft toward said first disc while said second disc is being rotated.

References Cited in the file of this patent

UNITED STATES PATENTS

| | | |
|---|---|---|
| 2,737,646 | Muffly | Mar. 6, 1956 |
| 2,750,579 | Lekas et al. | June 12, 1956 |
| 2,772,135 | Hollabaugh et al. | Nov. 27, 1956 |
| 2,899,260 | Farrand et al. | Aug. 11, 1959 |
| 2,908,541 | Fomenko | Oct. 13, 1959 |

FOREIGN PATENTS

| | | |
|---|---|---|
| 1,119,186 | France | Apr. 3, 1956 |